US006980256B2

(12) United States Patent  (10) Patent No.: US 6,980,256 B2
Cuccia                          (45) Date of Patent:   Dec. 27, 2005

(54) INSTANT REPLAY OF DIGITAL VIDEO OPTIMIZED USING NON MPEG FRAME TAGS

(75) Inventor: David W. Cuccia, Hopewell Junction, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/882,080

(22) Filed: Jun. 15, 2001

(65) Prior Publication Data

US 2002/0051621 A1    May 2, 2002

Related U.S. Application Data

(63) Continuation of application No. 08/927,830, filed on Sep. 11, 1997, now Pat. No. 6,295,094.

(51) Int. Cl.[7] .............................................. H04N 5/59
(52) U.S. Cl. ...................... 348/559; 348/559; 348/560; 386/111; 386/112
(58) Field of Search ................................ 348/559–560, 348/564–568; 386/109, 111–112, 68–70, 386/95; 375/240.23, 240.25; H04N 5/59

(56) References Cited

U.S. PATENT DOCUMENTS

| | | | | | |
|---|---|---|---|---|---|
| 5,428,403 | A | * | 6/1995 | Andrew et al. | 348/699 |
| 5,438,423 | A | * | 8/1995 | Lynch et al. | 360/13 |
| 5,608,864 | A | * | 3/1997 | Bindlish et al. | 345/501 |
| 5,612,788 | A | * | 3/1997 | Stone | 386/109 |
| 5,729,280 | A | * | 3/1998 | Inoue et al. | 348/559 |
| 5,933,195 | A | * | 8/1999 | Florencio | 375/240.15 |
| 6,020,924 | A | * | 2/2000 | Jahanghir | 375/240.16 |
| 6,044,431 | A | * | 3/2000 | Greenwood et al. | 365/219 |
| 6,167,083 | A | * | 12/2000 | Sporer et al. | 375/240.01 |
| 6,295,094 | B1 | * | 9/2001 | Cuccia | 348/559 |
| 6,337,880 | B1 | * | 1/2002 | Cornog et al. | 375/240.01 |
| 6,704,494 | B1 | * | 3/2004 | Chujoh et al. | 386/109 |
| 6,741,617 | B2 | * | 5/2004 | Rosengren et al. | 370/536 |
| 6,771,884 | B2 | * | 8/2004 | Nagasawa | 386/70 |
| 2002/0188943 | A1 | * | 12/2002 | Freeman et al. | 725/38 |

* cited by examiner

Primary Examiner—Brian Yenke

(57) ABSTRACT

A method and device for providing instant replay in an MPEG video decoder. The method and device provides non-MPEG frame tags for correlation of the frames in the decompressed domain to the frames in the compressed domain.

1 Claim, 6 Drawing Sheets

INSTANT REPLAY OF DIGITAL VIDEO OPTIMIZED USING NON MPEG FRAME TAGS

CROSS REFERENCE TO RELATED APPLICATIONS

This is a continuation of application Ser. No. 08/927,830 filed Sep. 11, 1997 now U.S. Pat. No. 6,295,094.

BACKGROUND OF THE INVENTION

1. Field of the Invention

This invention relates in general to video processing and in particular to a method and device for providing instant replay of video.

2. Description of the Prior Art

Instant replay permits a viewer to rewatch a portion of a video program for closer study, e.g. to rewatch a play in a sporting event. In U.S. Pat. No. 5,371,551 an instant replay device is provided with a circular memory for recording video for later replay. Each frame of video is simply stored in a memory at an address equally spaced from the next frame, which means the memory in U.S. Pat. No. 5,371,551 does not take advantage of current MPEG standards which permit variable length encoding of frames.

In addition current MPEG-2 decoders receive the video information in the form of a compressed bit stream. The order of the pictures (e.g. I,P,B,B) in the compressed bit stream is different than the decompressed order in which the video is displayed (e.g. I,B,B,P). This reordering is necessary to ensure that all of the anchor frames needed to reconstruct the current frame have been received by the decoder first. The MPEG syntax does not contain any element which correlates the order of the pictures in the compressed domain to the order of the pictures in the decompressed domain.

For operation of instant replay some correlation would be advantageous because a user typically views the decompressed video and then selects a portion of this video to be instantly replayed. This portion is then retrieved from memory and redisplayed. Since there is no correlation in MPEG between the decompressed video that is displayed and the compressed video, the storage device must store the decompressed video in order to begin replaying the video at the appropriate point in the video stream. This requires large costly memories.

SUMMARY OF THE INVENTION

Accordingly it is an object of this invention to provide instant replay for an MPEG encoded video stream, including video streams received via live terrestrial transmission, by storing the data in the compressed domain and providing non-MPEG frame tags for correlation to the decompressed domain.

It is another object of the invention to provide instant replay of video without adding substantial cost to the video decoder.

It is a further object of the invention to provide instant replay which is not limited to any one profile or level of MPEG.

It is yet another object of the invention to provide instant replay in a system which optimizes the use of the memory by utilizing the benefits of variable length encoding.

Still other objects and advantages of the invention will in part be obvious and will in part be apparent from the specification.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention reference is had to the following drawings.

DETAILED DESCRIPTION OF THE PREFERRED EMBODIMENTS

Figure 1:
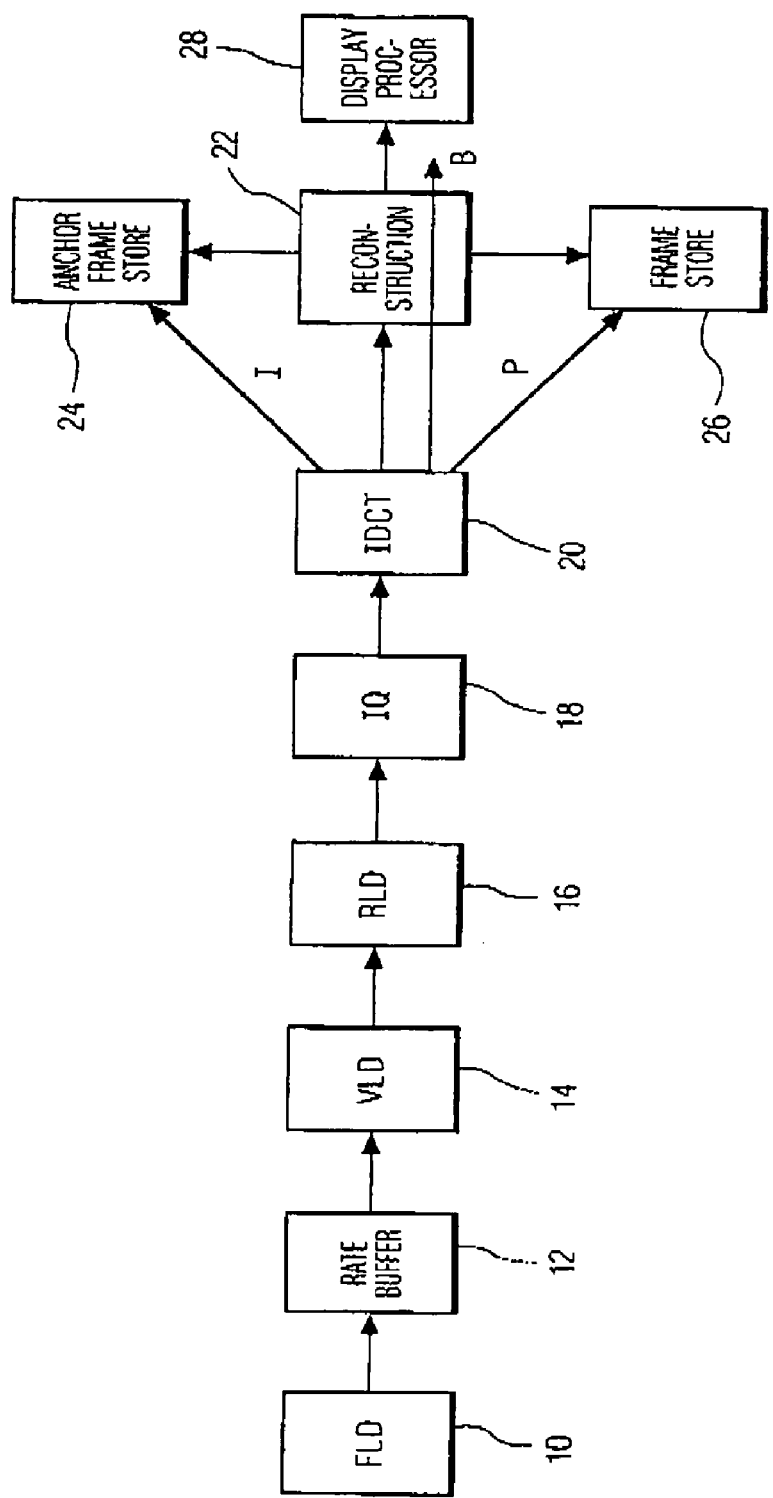
FIG. 1 shows an example of the components of prior art video decoders.

FIG. 1 shows the components of present MPEG video decoders. The fixed length decoder (FLD) 10 decodes the syntactical information in the headers of the MPEG video stream from the PES layer to the Picture layer and provides this information to many of the remaining decoder elements. The FLD 10 also indicates to the rate buffer 12 the beginning of the compressed video sequences, pictures and/or GOPs etc. The data arrives at the rate buffer 12 at a slower data rate than the data rate required for decoding and viewing. By buffering the data in the rate buffer 12 the data can be synchronized to the audio stream and to time stamps used for buffer management and provided to the display at a real time data rate.

The variable length decoder (VLD) 14 transcodes the variable length code words of the compressed video data into run length codewords. The run length decoder (RLD) 16 transcodes run length code words into quantized coefficient values. The inverse quantizer (IQ) 18 maps quantized coefficient values to non-quantized coefficient values e.g. discrete cosine transform (DCT) coefficient values. The inverse discrete cosine transformer (IDCT) 20 performs an inverse transform operation on the DCT coefficients to produce pixel value differences. The motion compensation reconstruction subsystem 22 takes the pixel value differences and uses motion vectors and the frames (e.g. I and P frames) stored in the anchor frame stores 24 and 26 to build the decompressed video frames. The I frames are stored in anchor frame store 24 and then displayed. As the I frame is displayed, the following P frame is reconstructed and stored in the frame store 26 and the B frames are decoded by the reconstruction subsystem 22. The decompressed pixel values are displayed by the display processor 28.

As stated above the rate buffer 12 stores the compressed video pictures. The display processor 28 displays the decompressed video pictures. The order in which the decompressed pictures are displayed is not the same as the order in which the compressed pictures are stored. So, for example, if the compressed video stream is $I_1, P_4, B_2, B_3 \ldots$ , the display order may be $I_1, B_2, B_3, P_4 \ldots$ . This reordering poses a problem for implementing instant replay. The problem is as follows: assume instant replay of the last two displayed pictures is requested while the $P_4$ picture is being displayed. In the decompressed domain the $B_3$ and $P_4$ picture would be redisplayed, since they are the last two pictures. In the compressed domain the $B_2$ and $B_3$ pictures would be redisplayed, as these are the last two pictures stored in the rate buffer 12. Since, the user is watching the decompressed video it is this video ($B_3$, $P_4$) that the user would like replayed, but the rate buffer 12 does not hold the pictures in this order ($B_2$, $B_3$). If a request for instant replay is received by the video decoder it must determine which picture was last displayed and retrieve and redisplay the last X number of pictures depending on the length of instant replay requested. This means that if the $P_4$ frame is being displayed (i.e. the fourth frame of the decompressed video information), and only the compressed frames are stored, the replay process must correlate the decompressed displayed $P_4$ frame to the position in the rate buffer 12 of the compressed $P_4$ frame (i.e. the second frame of the compressed video information). (This example disregards the need for anchor frames as explained below).

In addition once the frames are in the decompressed domain the frame type information, whether a P, B or I frame is being displayed, is lost. The instant replay decoding process, however, needs this "frame type" information as it must start the decoding process with an I frame in order to decode the frames in accordance with MPEG. Therefore, the nearest I frame to the first instant replay frame to be decoded must be found in the rate buffer 12 which means frame type information (I,P,B) must also be retrieved from the compressed domain.

Figure 2:
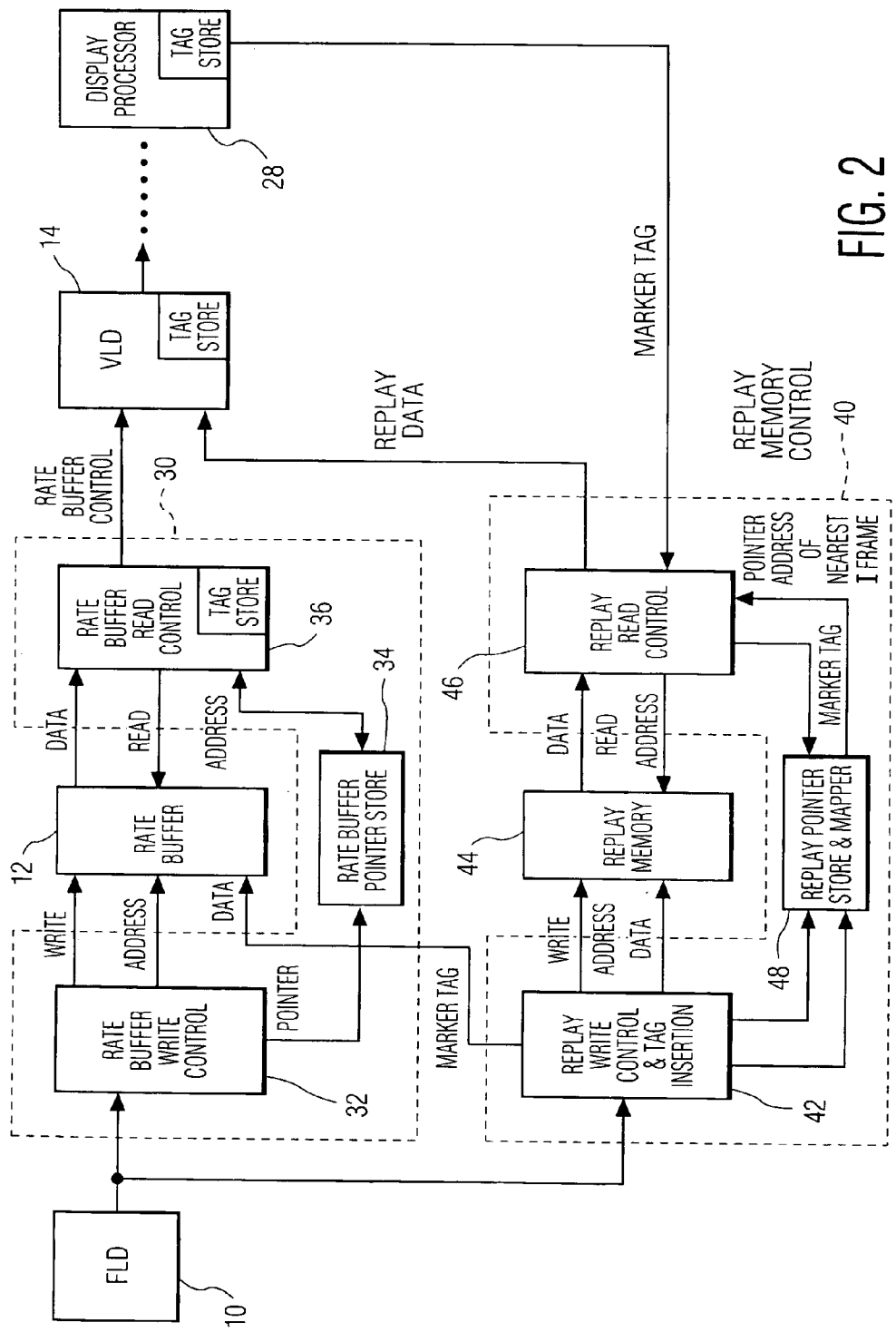
FIG. 2 shows a block diagram of the FLD, VLD, rate buffer, replay memory, rate buffer control and replay controller in accordance with the invention.

FIG. 2 shows a video decoder which solves this problem. The video picture information is received from the FLD 10 in the rate buffer write control 32 of the rate buffer control 30, and in the replay write control and tag insertion 42 of the replay memory control 40. The rate buffer write control 32 writes the video picture information and the necessary header information which dictates the type of picture (I,P,B) into the rate buffer 12 and provides pointer values to the rate buffer pointer store 34 which pointer values indicate the starting address of the pictures. There is no requirement that the pointer values must keep track of "pictures" as in an alternative embodiment the pointer values could indicate the beginning of sequences, groups of pictures (GOPs), I frames etc. The rate buffer read control 36 receives the pointer values from the rate buffer pointer store 34 and reads the picture information from the rate buffer 12.

The invention provides the addition of marker tags to the video picture information. The replay write control and tag insertion 42 adds tags to each picture, each tag having a unique counter value (e.g. 0 to 1799). The range 0–1799 (1800 pictures) allows for up to 60 seconds of storage of 30 Hz material (1800 frames of 30 frames/sec material=60 seconds of replay video). The invention is not limited to counter values (0–1799) as other types of tags could be used.

Figure 4:
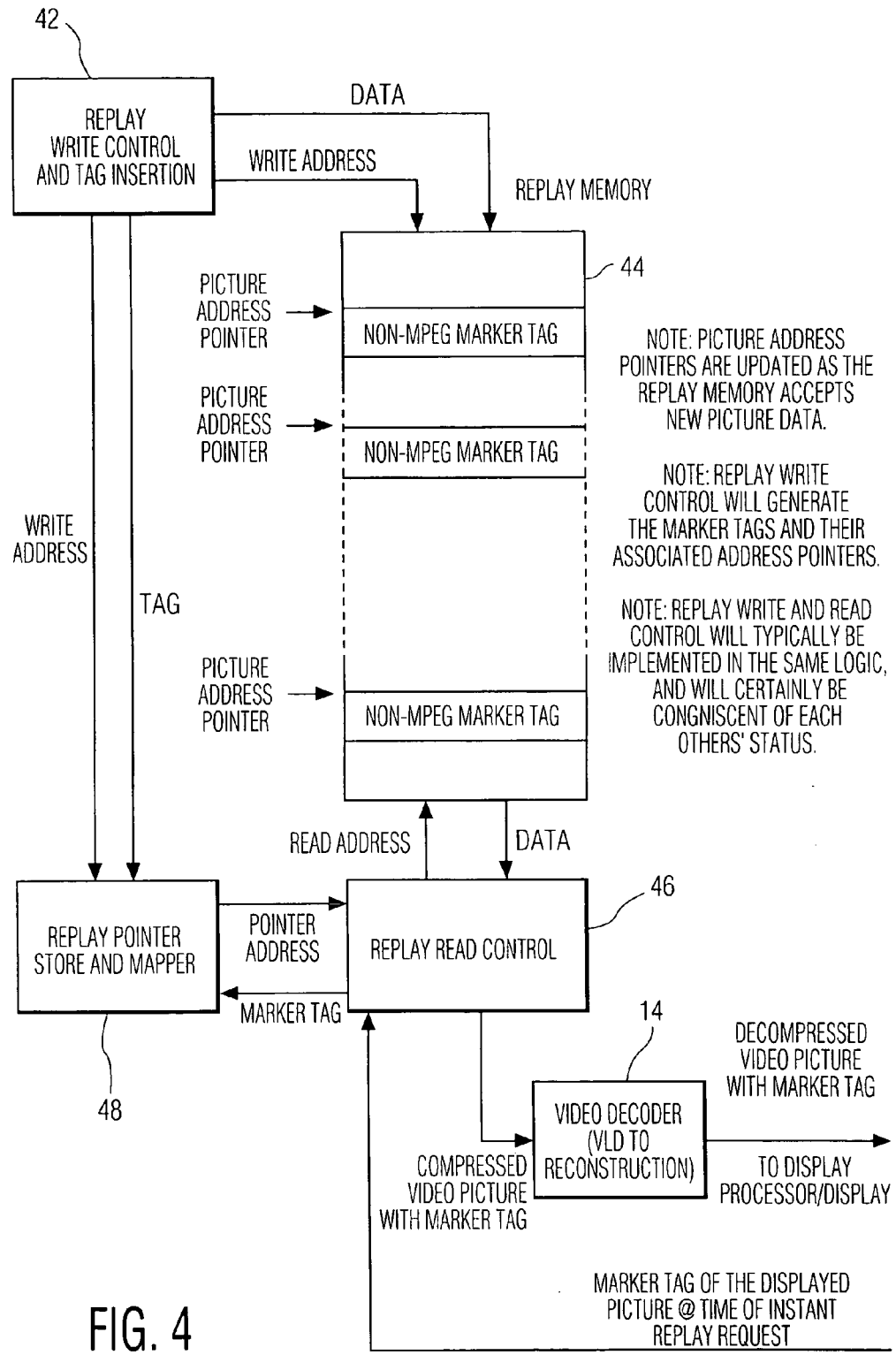
FIG. 4 shows a more detailed view of the replay memory and replay controller.

During decode the FLD 10 detects the start of the pictures (the beginning point of the video information for each picture), flagging each start location in the bit stream. The marker tags are placed into the partially decoded bitstream by the replay write control and tag insertion 42, creating a modified bit stream which is written to both the rate buffer 12 and the replay memory 44. The marker tags are stored in the replay pointer store and mapper 48 and mapped to the pointers. The pointers indicate the addresses where the start of the pictures are stored. FIG. 4 shows one example of the replay memory 44 and its control features.

Figure 5:
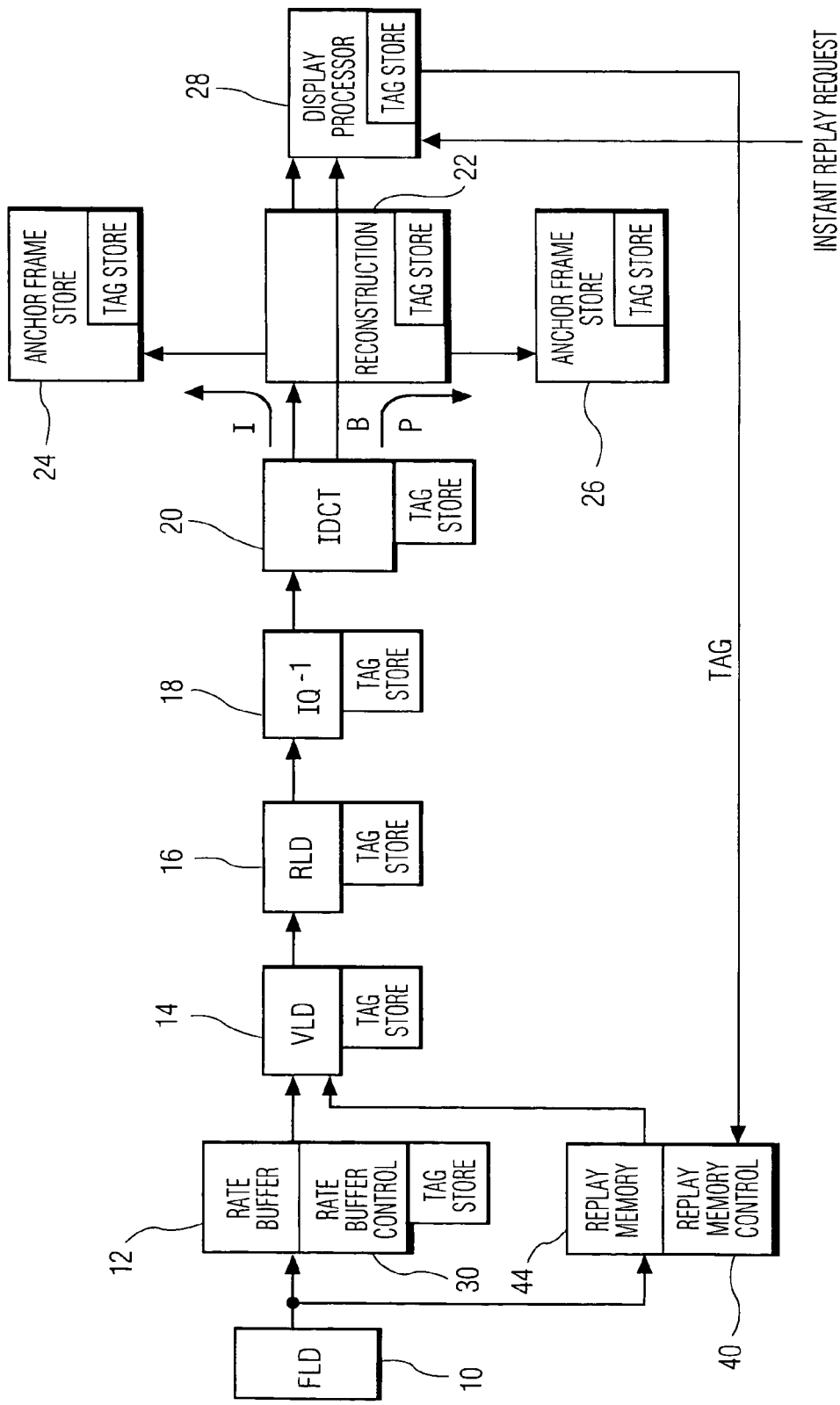
FIG. 5 shows the elements of a video decoder in accordance with the invention.

The rate buffer read control 36 receives the pictures along with the marker tags and provides them to the VLD 14. As seen in FIG. 5 the tag is carried throughout the decoder to the display processor 28.

If the display processor 28 receives an instant replay request it provides the marker tag of the presently viewed frame to the replay read control 46. The replay read control 46 provides the marker tag to the replay pointer store and mapper 48. The pointer store and mapper 48 maps the marker tag to the address in the replay memory 44 of the location of the video frame having the corresponding marker tag. The replay read control 46 then rolls back its address to the address of the start-of-replay video frame occurring approximately 1800 frames before the marked frame. If the start-of-replay video frame is not an I frame the nearest I frame in the bit stream is used and this frame becomes the new start-of-replay video frame. The method in which this I frame is found is explained below but involves the replay read control 46 accessing the replay memory location of the start-of-replay frame and checking the header information of this frame to see if it is an I anchor frame. If the start-of-replay frame is not an anchor frame an earlier pointer value is requested from the replay pointer store and mapper 48. For example, in one embodiment the address roll back can be determined with reference to stored marker tags. The pointer store and mapper 48 stores the information indicating the nearest I frame and provides the address of the nearest I frame as the start-of-replay video to the replay read control 46. In other words, the marker tag itself for each frame references the nearest I frame. The replay video is then provided to the VLD 14 for decoding. One of the benefits of this invention is that the replay memory 44 stores the compressed video which means the replay memory 44 is relatively small as compared to storage required for the decompressed video. In addition, because the marker tags reference the address of the start of pictures there is no need to store the pictures equally spaced from one another to maintain easy referencing. Instead, each frame is stored using as little memory as required for that particular variable length encoded frame, and direct correlation between the compressed and decompressed domains is still maintained.

The following is a description for detecting the first I frame for instant replay. Since the video data is stored in the compressed order, all anchor frames needed to decode the current frame are stored in memory before the current frame. The anchor frame searching schemes described below can be performed by the replay pointer store and mapper 48 in conjunction with the replay read control 46.

If the Start-of-replay Frame From the Instant Replay Memory is an I Frame

The replay memory controller 40 reads this I frame into the video decoder. The replay read control 46 rolls its address forward to the next P frame. If reference is made to FIG. 3B, this means the $I_0$ frame is read and then the $P_3$ frame. The $P_3$ frame is decoded from the $I_0$ frame, then all frames after the $P_3$ frame are decoded. (See example 1 below).

If the Start-of-replay Frame From the Instant Replay Memory is a P Frame

The replay memory controller 40 looks for the preceding I frame in memory. This I frame (e.g. $I_0$ in FIG. 3b) is used to decode the start-of-replay P frame (e.g. $P_3$). Then, the memory controller 40 reads forward in memory to the anchor frame following the start-of-replay P frame. If this anchor frame is also a P frame (e.g. $P_6$), then the preceding I frame is used to decode this P frame. Both the start-of-replay P frame and following P frame are used to decode the B frames following start-of-replay (e.g. $I_0$ is used to recover $P_3$ and $P_6$; $P_3$ and $P_6$ are used to recover $B_4$, and $B_5$). See example 2 below. If the anchor frame following the start-of-replay P frame is an I frame, then the start-of-replay P frame and that I frame are used to decode the B frame(s) following the start-of-replay P frame (see example 3 below).

If the Start-of-replay Frame From the Instant Replay Memory is a B Frame

The replay controller 40 searches back through the instant replay memory 44 until a P frame (here labeled $P_1$ for clarity) is found. $P_1$ is needed to reconstruct the start-of-replay B frame, and is retrieved from the instant replay memory. At this point the replay controller 40 searches for an I frame. If the $P_1$ frame is immediately preceded by an I frame, then it searches no further: the I frame and the $P_1$ frame thus found are used to reconstruct the start-of-replay B frame. If the $P_1$ frame is not immediately preceded by an I frame, then the preceding P frame, along with the $P_1$ frame, are used to reconstruct the start-of-replay B frame. However, both P frames must themselves be reconstructed from the preceding I frame. Thus, the replay controller 40 must find the preceding I frame (skipping over any further P frames it may encounter). Once the I frame is found, it is used to decode the two P frames, which in turn, are used to decode the start-of-replay B frame. (See examples 4 and 5 for clarification).

EXAMPLES

Example 1

Figure 3A:
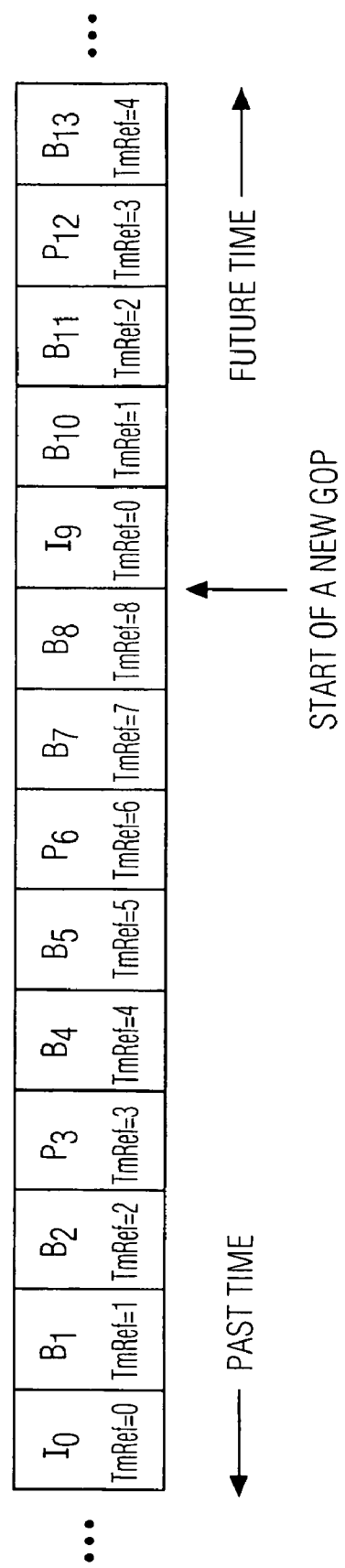
FIG. 3A shows the components of the video stream in the decompressed display order.
Figure 3B:
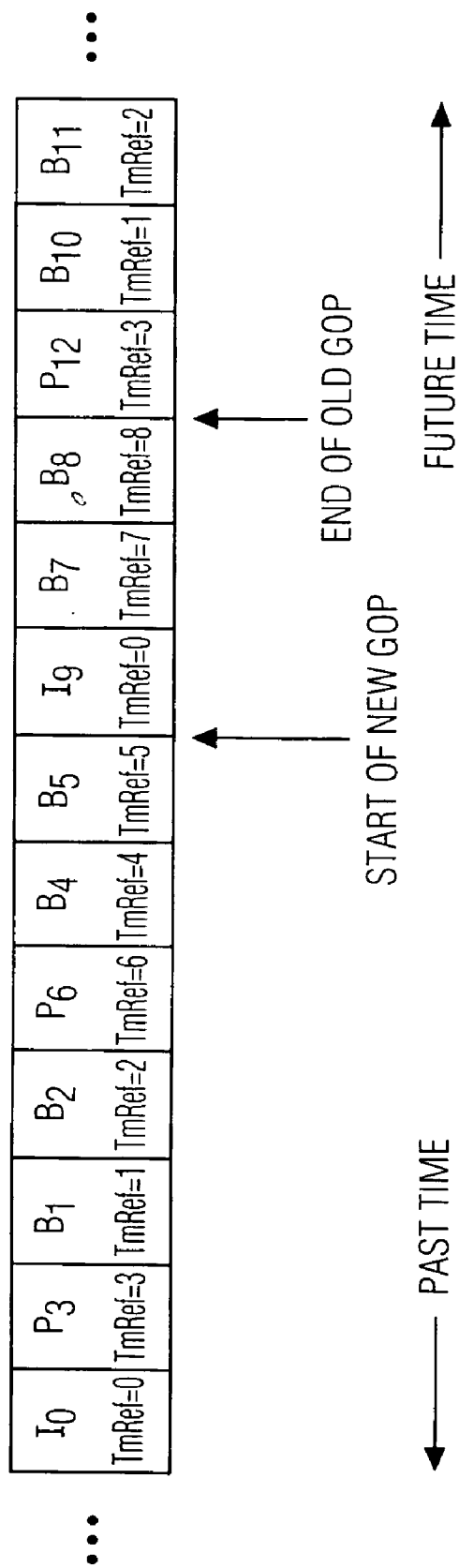
FIG. 3B shows the components of the video stream in the compressed order.

Assume the start-of-replay frame is found to be $I_9$ in FIG. 3b. $I_9$ is loaded into the video decoder, then $P_{12}$ is decoded, then $B_{10}$ and $B_{11}$ (note: it skips $B_7$ and $B_8$ since they won't be in the GOP started by $I_9$). After $B_{10}$ and $B_{11}$, it decodes as normal.

Example 2

Suppose the start-of-replay frame is $P_3$ in FIG. 3b. First the replay read control 46 reads back through the replay memory to find the preceding I frame (e.g. $I_0$). Then the replay read control 46 searches forward in memory to the anchor frame following $P_3$. In this case, the next anchor frame will be $P_6$. Then the decoder uses $I_0$ to decode both $P_3$ and $P_6$. Then $P_3$ and $P_6$ are used to decode $B_4$ and $B_5$. After $B_4$ and $B_5$, normal decoding proceeds.

Example 3

Suppose the start-of-replay frame is found to be $P_6$ in FIG. 3b. The replay read control 46 first looks for the preceding I frame (in this case, $I_0$). Then it looks for the anchor frame following $P_6$, (in this case, $I_9$). The video decoder uses $I_0$ to decode $P_6$, then uses $P_6$ and $I_9$ to decode $B_7$ and $B_8$. Normal decoding proceeds after $B_8$

Example 4

Assume the start-of-replay frame is found to be $B_1$ in FIG. 3b. The preceding P frame (in this case $P_3$) is then found. Then the replay memory controller searches for the previous I frame (in this case $I_0$). The video decoder uses $I_0$ to decode $P_3$. The video decoder uses $I_0$ and $P_3$ to decode $B_1$. The video decoder decodes normally thereafter.

Example 5

Assume the start-of-replay is found to be $B_5$ in FIG. 3b. The replay memory controller first looks back earlier in time to find the first P frame (in this case, $P_6$). Then it searches further for an I frame. At one point, it comes across $P_3$. This indicates that the B frame in question will have to be decoded from two P frames. Therefore, $P_3$ is noted. Looking further back into memory, the replay memory controller comes across $I_0$. The decoder uses $I_0$ to decode $P_3$ and $P_6$. The decoder uses $P_3$ and $P_6$ to decode $B_5$. The decoder proceeds with normal decoding after $B_5$.

In an alternative embodiment of the invention the replay memory 44 and the rate buffer memory 12 can be combined. The pointer address of each frame can be used as the marker tag and passed along the decoding chain. The pointer address can then be used to locate in the combined memory the present compressed video frame being viewed. Such a scheme would eliminate the duplication of the control systems 30 and 40 and the memories 12 and 44.

It should be noted that the invention has been described with reference to storing the slice layer of the MPEG stream, but it can also be implemented in other layers such as the transport layer. In addition although the invention was described with respect to MPEG1 and MPEG2, it can be implemented in any MPEG video syntax that uses compressed and decompressed video signals in the decoder.

A further note, if the video stream includes SMPTE time codes then these can be used as the marker tags.

It will thus be seen that the objects set forth above, among those made apparent from the preceding description, are efficiently attained and, since certain changes may be made in carrying out the above method and in the construction set forth without departing from the spirit and scope of the invention, it is intended that all matter contained in the above description and shown in the accompanying drawings shall be interpreted as illustrative and not in a limiting sense.

What is claimed is:

1. A video decoder for providing instant replay of video that has been compressed and variable length encoded, comprising:
    a memory for storing the variable length encoded compressed video in a manner that takes advantage of the variable length encoded video by optimizing the use of the memory;
    a tag inserter, for inserting marker tags into each picture of the compressed video stream which reference locations in memory where each picture of the video is stored;
    a decompressor for decompressing the compressed video;
    a correlator for using the marker tags to correlate decompressed portions of the video to the location in memory of the corresponding compressed portions and for locating in the memory the nearest previously displayed anchor frame.

* * * * *